P. E. EDELMAN.
APPARATUS FOR WIRELESS TELEGRAPHY AND THE LIKE.
APPLICATION FILED AUG. 19, 1912.

1,214,022.

Patented Jan. 30, 1917.
2 SHEETS—SHEET 2.

WITNESSES:
Meyer Edelman
Rose Edelman.

INVENTOR.
Philip E. Edelman

UNITED STATES PATENT OFFICE.

PHILIP E. EDELMAN, OF MINNEAPOLIS, MINNESOTA.

APPARATUS FOR WIRELESS TELEGRAPHY AND THE LIKE.

1,214,022.   Specification of Letters Patent.   Patented Jan. 30, 1917.

Application filed August 19, 1912. Serial No. 715,850.

*To all whom it may concern:*

Be it known that I, PHILIP E. EDELMAN, a citizen of the United States, residing at Minneapolis, in the county of Hennepin and State of Minnesota, have invented a new and useful Apparatus for Wireless Telegraphy and the like, of which the following is a specification.

My present invention relates to wireless space communication or control and has for one of its objects the perfection of the prior art to overcome defects, among which the following may be mentioned: 1. Slow rate of communication. (Words per minute.) 2. Unsatisfactory selectivity of apparatus. 3. Injurious interference. 4. Lack of secrecy. 5. Inability to utilize mechanical recorders satisfactorily. 6. Drowning of signals by static interferences. 7. Confusion of signals. 8. Inability of several nearby stations to work continuously and independently. 9. Non-precisive apparatus. 10. Impediment of high resistance detectors and circuits to oscillations.

My invention provides a system of communication or control which is practically free from interference, space tapping, static disturbances, and other defects. The apparatus used is not complicated and is reliable.

My invention is more particularly pointed out in the appended claims but in general I prefer to transmit integral parts of a code message differentially, making it practically impossible for an unauthorized station to intercept the message. Moreover, I prefer to replace the dashes of the code by dots to increase the speed of transmission. It will be obvious of course that the regular dot and dash code may be used if speed is no object, or the dots may be replaced by dashes if accuracy and clearness are essential. It is a common occurrence in the prior art to have a message repeated two or three times slowly before it is accurately received, a method which consumes valuable time. In accordance with the present invention I prefer to divide a given signal into a plurality of recognized groups, and to transmit the integral parts in a manner which distinguishes each part in a plurality of separate characteristics, as time duration, audible group frequency, and radio frequency, the latter of course determining a characteristic wavelength, and preferably a combination of two or all of these means.

In order to carry out this invention I provide novel means hereafter fully described.

It is understood that my invention is applicable to all forms of communication or control in which electric waves are utilized, although the embodiment in a signaling system is referred to in particular. This invention will be better understood by reference to the accompanying drawings, in which—

Similar reference characters refer to similar parts as far as is consistent with clearness.

Figures 1, 2, 3, 4, 5, 6, 7, 8, 9, 10:
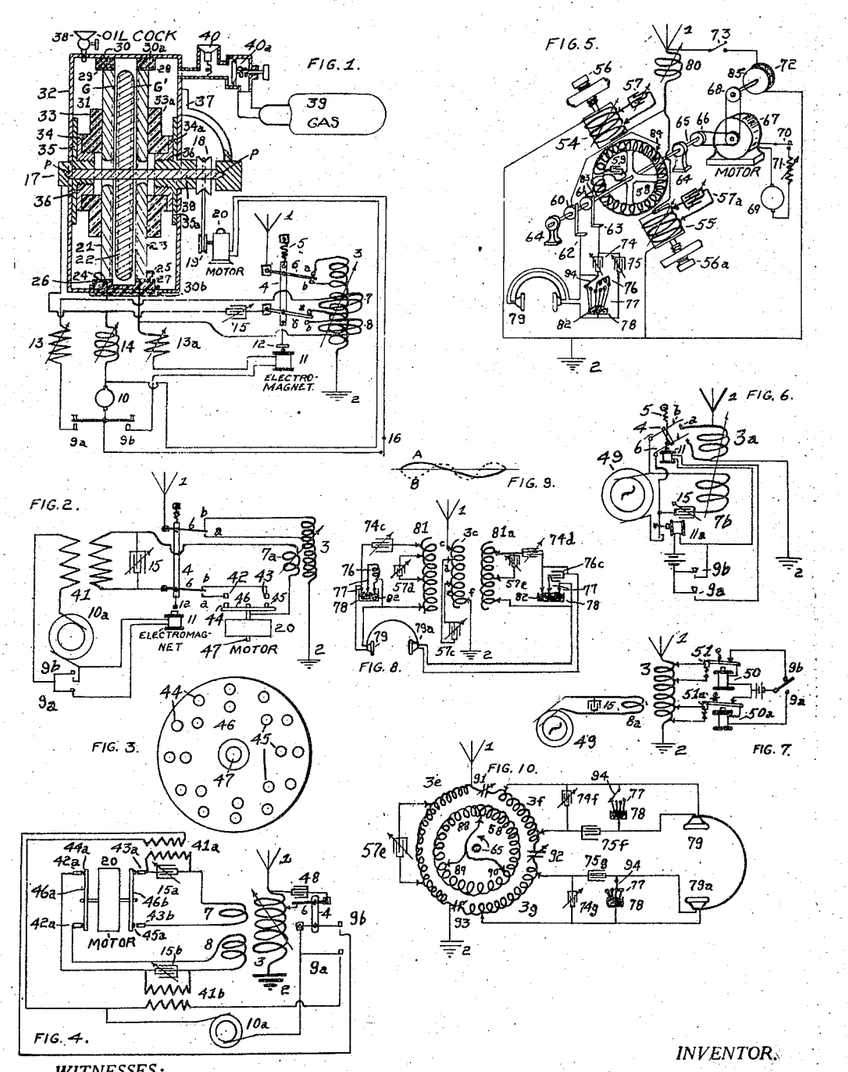
Figure 1 shows a suitable embodiment of the transmitter and is partly a vertical section of the electrode element used to produce suitable oscillations and partly a diagram of a suitable circuit therefor.
Fig. 2 is a diagram of a modification of Fig. 1.
Fig. 3 is a detail showing the face of the rotating disk of Fig. 2.
Fig. 4 is a diagram showing another modification of Fig. 1.
Fig. 5 is a schematic diagram showing a suitable embodiment of the receiver.
Fig. 6 is a diagram showing another modification of Fig. 1.
Fig. 7 is a diagram showing another modification of Fig. 1.
Fig. 8 is a diagram showing a modification of Fig. 5.
Fig. 9 is a diagram illustrating the function of part of the circuit shown in Fig. 8.
Fig. 10 is a diagram showing another modification of Fig. 5.
Figure 11:
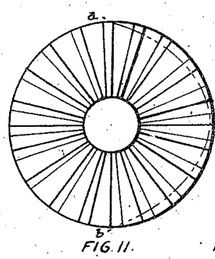
Fig. 11 is an elevation showing the segments on one of the electrodes shown in Fig. 1.
Figures 12, 13:
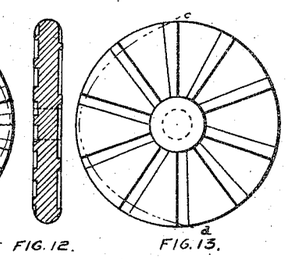
Fig. 12 is a sectional view of the rotary electrode of Fig. 1 showing the two sets of segments embodied therein.
Fig. 13 is an elevation showing the other stationary electrode of Fig. 1 provided with segments.

In Fig. 1, 1 represents the aerial or antenna system, 2 the ground system, 3 an inductance coil having two inductance coils 7, 8, respectively coupled magnetically therewith, and 4 is an insulated switch magnetically operated by 11 pulling armature 12 connecting therewith and spring restored by spring 5, whereby the insulated switch arms 7, 6, respectively contact with the positions a or b according to whether key $9^a$ or $9^b$ is closed. A generator 10 also connects to the double discharge gap 17 through 14, gap G, and 13 or 14, gap G', and $13^a$ respectively when $9^a$ or $9^b$ is closed. 17 consists of electrode 22 carried by shaft 38 and rotated by motor 20 via pulleys 18, 19 between and in close proximity to stationary electrodes 21, 23. These electrodes may be of any suitable conductor or metal and while the surfaces thereof may be smooth they are preferably segmented as indicated by Figs. 11, 12 and 13, in order to impart a plurality of recognizable audible group frequencies to the transmitted energy. These electrodes are inclosed by a casing 32 and are preferably operated in the presence of a gas supplied by 39 connecting therewith or a thin oil which may be supplied via the oil cock 38 also connecting therewith. The gas is preferred and is best supplied under a definite pressure. This gas should preferably contain hydrogen but may be ammonia or carbon dioxid. 39 indicates the gas supply connecting with 32 through suitable valves 40 and $40^a$. These valves are old and well known, 40 serving to control the pressure of the gas admitted to the interior 31 of casing 32 and 40 serving as a relief valve to avoid excessive pressure therein. Shaft 38 is mounted in 32 as shown to avoid leakage of the medium supplied to the interior 31 as hereinbefore set forth and is also provided with end bearings p, p, respectively to prevent side play and insure accurate adjustment of the gaps G, G'. 21 and 23 are substantially of similar construction except that when provided with segments the one has a greater number of segments (Fig. 11) than the other (Fig. 13). These plates are insulated from each other and from the casing 32 and shaft 38 as shown. Insulating flanges 33, $33^a$ respectively support these plates 21, 23 and are in turn supported by metallic flanges 34, $34^a$ respectively carried on screw threads 36, 36, by 35, $35^a$ attached to 32. It is understood that screws and other fasteners are omitted for the sake of clearness. The screw threads 36 enable the gaps G, G' to be closely adjusted. The plates and supports are preferably substantially constructed and the plates in particular should have a large radiating surface. The bearings, while constructed to prevent leakage of the gas or oil which may be introduced in 31 as set forth also serve to maintain the shaft in accurate alinement. The flanges supporting plates 21 and 23 should be of a size which will afford rigidity and strength. Metallic plates 26, 27, 28, 29 respectively mounted on insulation 30, $30^a$ and $30^b$ form a partial bearing and support for plates 21 and 23. 26 and 27 also serve as connecting plates to 21 and 23 via flexible conductors 24 and 25, whereby 21 and 23 are connected in circuits as shown. The gaps G, G' are made very minute, as for example .0075 inch. The double gap discharger 17 is well cooled in any case and the conditions essential for the production of well sustained oscillations are provided.

The rotating electrode 22 preferably has each of its two flat surfaces segmented to correspond respectively with the segments provided on 21 and 23, as indicated by Fig. 12. The segments on 21 and 22 forming gap G are understood as substantially identical in construction and uniformly disposed on said plates as shown. The same holds true for the segments on the other side of 22 and on 23 except that there is a different number of segments as indicated by Figs. 11, 12, and 13 whereby a different musical tone is secured when energy is passed through G than when passed through G'. The plates 21, 22, 23 are similar in dimensions as shown, Fig. 13 for example representing the segments on either 22 or 23 but a smaller shaft hole indicated by the dotted circle of Fig. 13 is of course provided in 22 to fit shaft 38 while larger holes are provided in the stationary plates 21, 23 as shown by the full line circle, Fig. 13 and Fig. 11. The section of Fig. 12 is accordingly taken along the curved cut a—b, c—d, respectively of Figs. 11 and 13 in order to show clearly the difference in the segments on the two surfaces of plate 22.

In use the oscillatory circuit through 17 is either through condenser 15, 7, and G, or 15, 8, and G', according as $9^a$ or $9^b$ is depressed. Adjustments are made accordingly so that when $9^a$ is depressed energy is radiated from circuit 1, 2, 3, in one definite wavelength and in one distinct audible group frequency, via 7, 15, G, and 13, 14, 10, $9^a$, and another different distinct wavelength and audible group frequency when $9^b$ is depressed. In the latter case energy is radiated by circuit 1, 2, 3, via 8, 15, G', and 14, $13^a$, 10, $9^b$. The adjustment is further preferably made so that switch 4 is always in either position a or b before energy reaches its blades 6, 6, thereby making the contacts of switch 4 without injurious sparking or arcing.

It is thus obvious that when energy is transmitted by depressing key $9^a$ it can only be received at a different wavelength or tune or both than when transmitted by depressing key $9^b$. 16 indicates a switch to control motor 20. 37, attached to 32 is a suitable support for the bearing $p$ on the pulley side of 17.

I prefer to send a regular code message all in dots with this arrangement. Thus in the word age, the dot of the "a" can be sent by depressing $9^a$, and the dash can be sent as another dot by depressing $9^b$. The other letters are similarly divided through the two circuits. Or again, one complete word may be sent by the use of $9^a$ and another by the use of $9^b$, alternately or in any desired order. Similarly in a word like "Patent" the first three letters can be sent by means of $9^a$ and the remainder by $9^b$. Numerous variations and modifications are obviously possible in this method and apparatus. $9^a$ and $9^b$ may be comprised by any of the well known forms of automatic circuit closers.

In the modification of Fig. 2 the same result is accomplished by using an alternator $10^a$ and a single primary inductance $7^a$ in connection with a double rotary spark gap 46. The latter consists of a motor driven disk 46 carrying two independent sets of equally spaced projections 44, 45 respectively opposite stationary electrodes 42, 43 either of which is connected in circuit by switch 4 as before. Fig. 3 shows how the projections 44, 45 are arranged on 46. Contact may be made with the shaft 47 of motor 20, Fig. 2. The adjustments are made to secure the same result as before.

Another modification of Fig. 1 is shown in Fig. 4, where a double rotary gap comprised in two separate disks $46^a$, $46^b$ driven by motor 20 and each containing a different number of equally spaced projections $44^a$, $45^a$, respectively, is used according to the method previously set forth and switch 4 which has a single contact lever 6 is mechanically connected to key $9^b$ and manually operated thereby to alter the emitted energy as regards its wavelength by including the shunt condenser 48 when $9^b$ is depressed but not when $9^a$ is used. In other respects the circuit will be readily understood.

A modification of Fig. 1 employing a high frequency generator 49 and utilizing the switch 4 to directly or inductively couple primary circuit 49, 15, $7^b$ to radiating circuit 1, $3^a$, 2 in the manner indicated according to whether $9^a$ or $9^b$ is depressed, is shown by Fig. 6. When $9^b$ is used, primary circuit 49, 15, $7^b$ is inductively coupled to radiating circuit 1, $3^a$, 2. Obviously the wave generators of the preceding figures may be comprised by 49 which indicates any suitable wave generator. When $9^a$ is used the energy is directly transferred to inductance coil $3^a$ and radiated differently from 1, $3^a$, 2.

In the modification of Fig. 7 a suitable source of energy 49, 15, $8^a$ is continuously coupled to the radiating system 1, 2, 3, and musically toned vibrators 5, $51^a$ operated by buzzers 50, $50^b$ respectively and controlled by connection through $9^a$ and $9^b$ as before are used to not only alter the wavelength of the emitted energy but also break it up into distinct group frequencies recurring at an audible rate. It is of course understood that when the inductance included in 1, 2, 3, is altered the wavelength is correspondingly changed.

Figure 14:
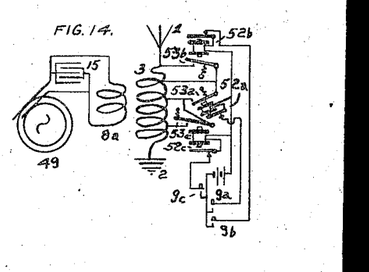
Fig. 14 is a diagram of a further modification of Fig. 1 whereby a blind signal may be transmitted.

In the modification of Fig. 14 a key $9^c$ is provided in addition to keys $9^a$ and $9^b$ to permit a third differentiation or the transmission of a series of blind signals to confuse would-be space tappers. The buzzers $52^a$, $52^b$, $52^c$ cause the respective contacts $53^b$, $53^s$, and $53^c$ to vibrate at different rates according to the key pressed and the prearranged adjustment; the result being the same as has already been set forth.

Those skilled in the art will understand that any change in the inductance or capacity of the radiating circuit correspondingly alters the wavelength of the emitted energy. It will further be understood that all the usual precautions as regards insulation and similar engineering details are to be observed in using my invention. It is further obvious that a wide variety of tones and wavelengths are afforded by the means I have hereinbefore described. Single musical tones or chords or both may be employed. A given station may be given a definite system of notes to distinguish from others. Thus, do and sol in G sharp may be assigned to a station in New York city while la and do in E flat may be assigned to a station in Washington. Confusion of signals may thereby be avoided and instant identification secured. The use of an undamped wave generator or at least one of the quenched discharge type, as described, is preferred because difficulties from double radiations due to undesired coupling effects are thereby avoided.

It is obvious that if distinctions in signal parts by means of different audible group frequencies alone are used anyone can get the signals the same as the desired parties. Again if a change of wavelength alone is relied upon the benefit of variable audible group frequency distinctions is neglected and confusion can readily result to the desired party as well as others. Thus while either can be used alone under favorable conditions the combination of variations in both the wavelength and audible group frequency is substantially essential. It should be noted that my invention requires no synchronously running parts at the transmitting and receiving stations. Synchronous running parts are at present an impossibility because they cannot be practically operated between widely separated stations. Moreover the means I show are adapted for use with energy to secure communication over great distances as contrasted with apparatus of laboratory dimensions as for example transmitters employing spark coils with interrupters on direct current supplies. Moreover a single radiating system suffices, two separate radiating or antenna systems at each station being unnecessary.

In accordance with my invention I provide novel receiving apparatus to coöperate with the transmitter to secure the full benefits thereof with a very minimum of interference from other stations, atmospheric and other disturbances. Heretofore the chief reliance in receiving practice has been put in stationary inductance coils loosely coupled to each other and each tuned to one certain wavelength. Those familiar with wireless operation however know that such coupling effects fail in practice to prevent interferences because the same coupling between the coils which transfers desired energy representing signals also transfers stray electrical impulses. My invention accordingly embraces means to not only select the desired energies but also to prevent injurious interference from undesired energies also coming to the receiver. I do this by providing separate means to care for each distinguishable form of energy which in practice is found to reach a receiving station. I recognize the natural distinctions in these several energies and take advantage of the natural characteristics of each to select out the desired energies to the exclusion of the others to a practicable extent.

A simple form of receiver suitable when little interference is met with is shown in Fig. 8. The absorbing circuit 1, 3$^c$, 2 is supplemented by a condenser 57$^c$ shunted about a portion $d$ to $e$ of 3$^c$ which is different from the portion $c$ to $f$ connecting with 1, 2, whereby the circuit is rendered particularly receptive to waves of two distinct wavelengths as indicated respectively by A and B, Fig. 9. In effect two resonant circuits are formed in a manner which permits the selection of energy from either one, one circuit comprising 1, $c$ to $f$ of 3$^c$, and 2 resonant to a frequency as B, Fig. 9, and the other comprising a circuit 1, $c$ to $d$ of 3$^c$, the reactance formed by 57$^c$ shunted about $d$ to $e$ of 3$^c$ and the portion $d$ to $e$ of 3$^c$, and the other portion $e$ to $f$ of 3$^c$ in series therewith and 2, resonant to a frequency of greater period as A, Fig. 9. This differs from the shunt arrangements of the prior art in receiving apparatus in that 57$^c$ is shunted about a portion only of 3$^c$ which is different from the portion connecting with 1 and 2 whereby a doubly resonant circuit is in effect formed whereas formerly where a shunt condenser has been used it has invariably been shunted about the same portion of the inductance, as 3$^c$, $c$ to $f$, as was included in circuit with the equivalent of 1, 2. In the connection of the prior art the absorbing circuit is accordingly resonant particularly to a single frequency instead of two frequencies as in this arrangement though of course other frequencies will in any case be able to pass through the absorbing circuit. In general then any energy reaching this absorbing circuit will be able to pass therethrough but two particular frequencies as A and B, Fig. 9 (it being remembered that a wavelength determines a frequency and vice versa) will find a circuit resonant thereto, whereas if $c$ and $d$ of 3$^c$ were made to coincide and $e$ and $f$ were made to coincide as in the prior art the same would hold true except that frequency A would for example have a resonant circuit while B would not. This arrangement further differs from prior circuits formed by a separate inductance equivalent to $c$—$d$ of 3$^c$ in series with a reactance formed by another inductance equivalent to $d$—$e$ of 3$^c$ shunted by 57$^c$, in series with another separate inductance equivalent to 3—$f$ of 3$^c$ because in such case the two frequencies as A and B, Fig. 9 could not be inductively transferred as shown in Fig. 8, a circuit through inductance 81 resonant to one frequency as A, Fig. 9 being coupled to 3$^c$ while another inductance 81$^a$ also coupled thereto is included by a circuit adjusted to resonance for the other frequency as B, the single inductance coil 3$^c$ serving to transfer both frequencies in the arrangement of Fig. 8. But other energies reaching the absorbing circuit in greater and lesser wavelengths will also be absorbed though a resonant circuit is not provided through any portion of 3$^c$ therefor. Such stray energy will in turn be transferred to circuits included by 81 and 81$^a$ but not being comprised in frequencies the same as either A or B can be absorbed as shown in Fig. 8. Thus an absorbing circuit comprised by condenser 57$^d$ shunted about a portion of 81 can be made resonant to a frequency lower than A while a similar absorbing circuit through 57$^e$ shunted about a portion of 81$^a$ can be made resonant to a frequency higher than B. Such stray energies as are also transferred by the circuits through 3$^c$ but in frequencies different from A and B can accordingly be largely absorbed by the circuits through condensers 57$^d$ and 57$^e$ which comprise no wave detector. The circuits through condensers 74$^c$ and 74$^d$ respectively resonant to alternating currents of frequencies A and B will accordingly be able to actuate the wave detectors 78, 78 very much stronger than the stray energies can even if the latter are of very much greater magnitude.

Figures 17, 18, 19, 20:
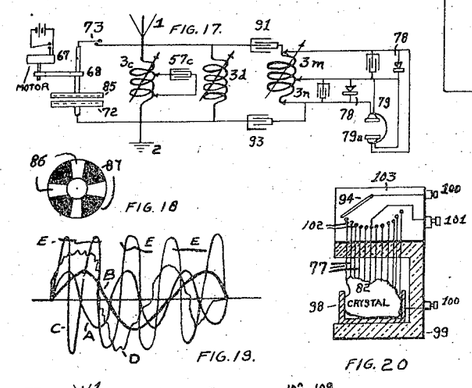
Fig. 17 is a diagram of a modification of Fig. 5.
Fig. 18 is a plan view showing a suitable construction for the disks of Figs. 5, 17, and 22.
Fig. 19 is a diagram illustrating the function of the receiving station provided by my invention.
Fig. 20 is a front elevation partially in section showing a suitable embodiment of the detector shown in Fig. 5.

The wave detector 78 is comprised by a sensitive crystal 82 which contacts with a plurality of electrodes or metallic points 77 about at least two of which a device such as the inductance 76 or condenser $76^c$ is preferably shunted. Receivers 79 and $79^a$ are connected about 78, 78 as shown so that when the transmitter, Fig. 1, is operated by key $9^a$ the transmitted energy will be received in its distinct audible group frequency in 79 and not in $79^a$ and vice versa when $9^b$ is depressed, so that sound waves forming an intelligible signal are received as sent by the transmitter. The function of the devices 76 or $76^c$ comprised in the wave detector is to increase the efficiency of this portion of the receiving apparatus. The crystal 82 may for example be galena and the several electrodes 77 may be placed in contact therewith as indicated in Fig. 20. The devices 76, $76^c$ serve to both decrease the effective resistance offered by the wave detectors 78, 78, and also are found to increase the sensitiveness of 78, 78, due probably to reinforcing resonance effects produced thereby. For example, energy may accumulate in $76^c$ and be discharged through $79^a$ in time unison with the rectified current also supplied thereto by the wave detector 78 the net effect being a reinforcement of the sound waves emitted by $79^a$. These auxiliary resonance members 76, $76^c$ are best determined as to size empirically and do not form an essential part of the tuning means at the receiving station as for example the condensers $74^c$, $74^d$, do. From the discussion of this simple circuit it is evident that the embodiment shown by Fig. 5, which aims to secure the same result under more complex conditions often met with in practice, will be understood.

Firstly a double absorbing circuit is afforded by each of the two branches 1, 80, 54 with shunt 57 2, and 1, 80, 55 with shunt $57^a$, 2, whereby after the manner already set forth this double shunt circuit comprising the two double absorbing circuits aforesaid can be made resonant to each of two separate frequencies. Also stray energies absorbed in this double shunt circuit will be largely dissipated by dividing in the two branches and opposing their effects. The inductance coil 58 wound in the form of a ring armature and carried rotatably by shaft 65 mounted in bearings 64, 64, forms a closed circuit through condenser 59 and is inductively coupled to both 54 and 55 which are adjustable inductance coils whose couplings may be varied by moving them by means of screw adjustments 56, $56^a$. This closed circuit 58, 59 is analogous to the shunt absorbing circuit comprised by $57^e$ shunted about a portion of $81^a$ in Fig. 8 and will absorb frequencies to which it is resonant, or nearly resonant. Now adjustable taps 83, 84 are respectively connected to slip rings 60, 61 connecting with collecting brushes 62, 63 which are connected to condenser 74, thereby forming two circuits respectively resonant to two separate frequencies each of which is higher than the frequencies for which the closed circuit 58, 59 is alone resonant. One of these latter circuits comprises 74, a portion of 58, and 59 and may be adjusted to one of the desired wavelengths. The other circuit comprises 74, and a portion of 58 but not 59. A further circuit is comprised by 74 in series with the reactance formed between terminals 83, 84 by the divided portions of 58, one of which contains 59.

My multipoint detector 78 connects with 74 through condenser 75 and has the telephone receivers 79 shunted thereabout in the usual manner. It is obvious that resonant circuits are provided such that each of two energies of different wavelength as transmitted in accordance with my invention and reaching this receiver will be transferred to the detector 78 and translated into sound waves by the telephone receivers 79 shunted thereabout, while other energies comprised in the form of alternating currents of greater and lesser frequencies when they pass through inductance 80 can be absorbed largely in 57, $57^a$, and in the closed circuit 58, 59 without being recorded by 79. This will be better understood by reference to Fig. 19 where A represents one desired energy and B the other, while C represents an interfering impulse caused by another transmitter from which signals are not desired. D represents stray impulses reaching the receiving station in the form of irregular undulations of energy and E represents stray unilateral impulses also arriving at the receiver. Now then without closing switch 70 or 73, Fig. 5, means have already been described which enable energies such as A and B, Fig. 19, to operate telephone receivers 79 while for example energy represented by D and E will be largely absorbed in the several auxiliary circuits provided therefor as set forth. If now switch 70 be closed to operate motor 67 which drives pulley 66 carried by shaft 65 and the speed is regulated by adjusting the current from 69 by means of a resistance 71, 58 may be revolved at any desired rate to take care of most stray energy of the type represented by E, Fig. 19, which energy of course is able to transfer itself into any of the circuits, as well as any of the other undesired energies not otherwise cared for. This is considered to be due to the rapid rotation which enables the desired energies to be transferred to 79 but neutralizes such undesired energies as are not otherwise cared for in the manner set forth. 58 is of course preferably an air core inductance. The rotation is thought to have the effect of dividing undesired unilateral impulses so that they are absorbed in one of the aforesaid circuits without affecting 78 or 79. The rotation further improves the selectivity of the apparatus.

In addition to the energies represented in Fig. 19, strong charges of static electricity may at times accumulate on 1 and set up relatively high potential disturbances in the receiving apparatus. I therefore provide a static killer to take off such charges and intermittently provide a short path therefor around the receiving apparatus at a rate which does not prevent the normal reception of the desired energies. When therefore such disturbances are met with the switch 73 may be closed thereby providing a path from 1 to 2 through 73, 72, 85 intermittently as the disk 85 is rotated via pulley 68 by 67 in close proximity to a similar disk 72, both 72 and 85 being constructed with a plurality of alternate conducting and insulated surfaces such for example as indicated by Fig. 18, where 87 represents the insulated segments and 86 the conducting segments therebetween. The adjustment may be such that the conducting surfaces 86 on each plate 85, 72 either come very close to each other or else touch each other intermittently, being effectively separated and insulated from each other when opposite to the portions 87 of the other disk 72 or 85 as the case may be. The effect is that charges accumulating on 1 are cared for as soon as they occur by the direct short path provided through 72, 85 at a very rapid rate and that inasmuch as the rotary tuner 54, 55, 58, is only shunted thereby during a small portion of the time the desired energies can reach 79 therethrough at the plurality of times when the portions 86 are opposite the corresponding portions 87 of the coöperating disk of the static killer. By suitably adjusting the speed of rotation the desired energies can be transferred to 79 substantially without any interference from the disturbances which would otherwise render the apparatus temporarily inoperative as in the prior art. Moreover it is to be noted that in case the members 21, 22, 23 of Fig. 1 for example are not slotted as in Figs. 11, 12, 13 but left smooth or in the case when substantially undamped waves embracing no audible group frequency are otherwise transmitted, the device 72 85 not only serves as a static killer but also as a ticker or device to render such energy capable of producing audible effects on 79 when transferred thereto in the manner set forth, 72, 85 serving in such case to break up the energy into audible groups at the receiving station, as the rotary tuner is alternately by-passed thereby, and again left free to absorb and transfer other energies reaching 1 as already set forth. It is accordingly obvious that I provide means to coöperate with the transmitter described to receive the energies emitted thereby to the exclusion and notwithstanding the presence of interfering energies.

In the modification of Fig. 5 shown in Fig. 10, the rotary coil 58 is inductively coupled to inductance coils $3^e$, $3^f$, $3^g$ with relatively close coupling while each coil $3^e$, $3^f$, $3^g$, is feebly coupled to the other and also connected through condensers 91, 92, 93. Three shorter circuits are formed in 58 by connected contacts 88, 89, 90 and it will be obvious from the preceding discussion that a plurality of resonant and absorbing circuits to select energy in two desired frequencies and dissipate energy in a number of other frequencies are provided. The desired energies are transferred from $3^e$ to circuits including $3^f$, $3^g$ respectively via 58 while a plurality of other circuits resonant for other frequencies are also provided whereby energy may be dissipated without affecting 79 and $79^a$ after the manner already set forth. 58 may be rotated by shaft 65 as in Fig. 5.

Figure 15:
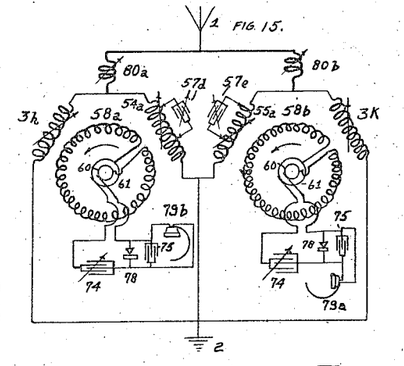
Fig. 15 is a diagram of a further modification of Fig. 5.

In the modification of Fig. 5 shown in Fig. 15, two rotating tuning elements are used. This modification provides additional absorbing, dissipating, and neutralizing circuits whereby more complex conditions than are indicated by Fig. 19 and which may occur in practice may be cared for. In this embodiment a regular circuit through $58^a$ is adjusted so that one desired energy will be received and translated thereby, while another circuit through $58^b$ is similarly adjusted for another desired energy. These two desired energies are respectively transferred to said circuits via $3^h$ and $3^k$, which are inductance coils coupled respectively thereto. The several absorbing, dissipating, and neutralizing circuits are comprised respectively by 1, $80^a$, $54^a$, 2; 1, $80^b$, $55^a$, 2; $80^a$, $80^b$, $54^a$, $55^a$; and the plural combinations thereof through $57^d$ and $57^e$ respectively after the manner already set forth for Fig. 8. The effect is accordingly the same as already set forth. All interference troubles are substantially avoided thereby though of course the other means herein described can be used in addition thereto as is obvious.

Figure 16:
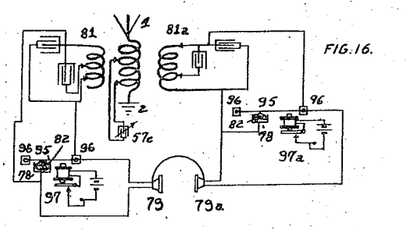
Fig. 16 is a diagram of another modification of Fig. 5.

The modification of Fig. 16 is in all respects similar to Fig. 8 except that a vibrating detector is employed. This device is well known in the art and consists of a steel wire 95 stretched between supports 96, 96, and contacting with a crystal 82 to form detector 78. A musically toned buzzer as 97 or $97^a$ is brought near 95 to vibrate it thereby causing incoming energy in the form of continuous waves not characterized by a group frequency to be provided with a group frequency by this means at the receiver.

In the modification of Fig. 17 the two receiving circuits through $3^m$, $3^n$ respectively are connected directly through condensers 91, 93 with 1, 2, the static killer 72, 85 is included in the manner already set forth, and additional shunt circuits through 3ᶜ, 57ᶜ, and 3ᵈ are provided to afford the same plural dissipating circuits as in the case of Fig. 5. 3ᵈ is preferably made with sufficient inductance to comprise with 1 and 2 a circuit resonant to long wavelengths while 3ᶜ is adjusted for short waves.

Figure 22:
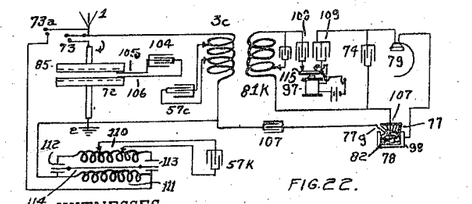
Fig. 22 is a diagram showing a further modification of Fig. 5.

In the modification of Fig. 22 terminals 105, 106 contact with the respective plates 72, 85 of the static killer and include an auxiliary condenser 104 as shown and the several dissipating shunt circuits tuned to different frequencies are comprised by inductances 110, 111, connected through condensers 112, 113 one terminal of each of which is joined by 114 as shown, 110 comprising also a condenser 57ᵏ which acts to provide a double resonance effect as explained for Fig. 8. 3ᶜ with 57ᶜ serves to transfer the two desired energies to 81ᵏ which is connected through condenser 74 with two condensers 108, 109 which have a relatively small capacity with respect to each other when the switch 115 is open and a relatively larger capacity when 115 is closed, thereby providing two circuits through 81ᵏ alternately which are respectively resonant to the desired frequencies. 115 is operated at a musical rate by buzzer 97. A wave detector 78 and telephone receiver 79 complete the circuit. Wave detector 78 in the modified form shown in Fig. 22 has the majority of its multiplicity of contacts 77 connected with one terminal 107 and resting on crystal 82 while the other terminal of the wave detector 78 consists of the metal containing cup 98 as indicated in Fig. 20. At least one of the electrodes as 77ᵍ in contact with 82 is grounded through a condenser 107 as shown to provide a direct leak for any electrostatically induced currents reaching 81ᵏ from any source. This modification as a whole accomplishes the results already set forth as is obvious because when 97 is in operation two circuits are intermittently provided through 74 to permit the detection of either of two energies in different wavelengths by 78 while they are also broken up into audible group frequencies, this form being preferred in case the transmitter, Fig. 1, for example is used without segmented disks as in Figs. 11, 12, 13. At the same time this modification provides the same plurality of means for avoiding trouble from interfering energies as has been fully set forth. Obviously at such times as not required the auxiliary absorbing devices need not be included in the circuit, switches 73, 73ᵃ being provided for this purpose.

Figure 21:
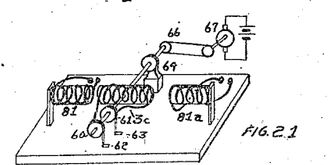
Fig. 21 is a schematic diagram showing a modification of the rotary tuning means shown in Fig. 5.

In Figs. 8, 16, and 22 for example where stationary inductances are shown it is obvious that at least one of the inductances may be rotated with respect to another with which it is inductively coupled after the manner of Fig. 5, a suitable arrangement being indicated by way of example in Fig. 21. Here motor 67 drives 66 which rotates inductance coil 3ᵉ provided with slip rings 60, 61 and brushes 62, 63 for connection in any of the circuits mentioned. 3ᵉ is inductively coupled to 81, 81ᵃ, two other inductance coils with respect to which 3ᵉ may accordingly be rapidly rotated.

In Fig. 20 a suitable embodiment of the multipoint detector comprised by my invention is shown by way of example. A sensitive crystal as galena is held by a metal cup 98 connected with binding post 100. A large number of contacts 77 which for example may be metal wires or other pieces of metal separately contact with the crystal 82, and are held in place by the insulating support 99. A switch 103 is mounted on 99 with a handle arm 94 and terminals 102 connecting with the contacts 77. At least one of the contacts 77 may be connected with a binding post 101 as shown in order to include a resonant device as described hereinbefore with the detector. In the manner shown by Fig. 20 a sensitive point may be quickly found or a number of the points 77 can be connected together as in Fig. 22 to afford at least one sensitive contact with 82 and probably more than one. Insensitive contacts have such a high resistance as to not affect the efficiency of the sensitive contacts also electrically connected therewith. One of the contacts 77 may serve as one terminal of the detector and the remainder of the contacts as the other terminal as in Fig. 8. It is obvious that the full value of the sensitive material 82 is accordingly utilized and that various modes of connections are possible as in the examples set forth.

It is obvious that when my invention is in use it will be practically impossible for an ordinary receiving system to receive an intelligible message, if indeed, any at all. When the wavelength only is varied in accordance with the parts of a signal, an ordinary receiving set cannot receive more than one of the parts at a time, which alone comprises no indication of intelligence. I prefer to have the wavelengths used for distinction separated by a sufficient length to avoid reception of both by a dully resonant receiver. When the audible group frequency alone is varied, the advantage of distinct signals and rapidity is secured without particular secrecy as this is desirable for instance for calling purposes, communication with ordinary stations, or for the general transmission of danger signals. It is not unlikely that a danger single tone or group of tones could be used as a recognized unmistakable signal for this purpose. For example S. O. S. may be arranged in a distinctive combination of audible group frequencies by means disclosed herein such as even an ordinary seaman could distinguish from all other signals.

When the transmitted impulses are not characterized by an audible group frequency they can be received and be so characterized for distinction and translation purposes at the receiving station as set forth. The preferred mode of use however comprises distinctions in both the audible group frequencies and the radio frequencies as set forth. When it is remembered that there is a wide range of different wavelengths, and of musical tones which can be comprised in audible group frequencies as set forth, and further that many combinations of these are possible, and that the divided signal may still further be safeguarded by a secret code and the transmission of blind or confusing signals, it is obvious that important information may be transmitted according to my invention so that cunning attempts at space tapping by unauthorized persons will have substantially no chance for success.

My invention also provides a system affording the very minimum of possible interference with other stations not being communicated with. If it is suspected that unauthorized persons have after a time ascertained the particular combinations being used the constants of the circuits may be changed to secure the same effect by a different combination and in fact such adjustments may be made as often as necessary. In general it is preferable to have the dots heard in one ear and the other differentiated dots representing the dashes of the code heard in the other as indicated in Fig. 8, but this is not essential. Two sensitive recorders such as two Einthoven galvanometers may be used instead of the telephone receivers in Fig. 8 for example. Heretofore the use of such recorders has been impracticable because of the slow sending speed necessary because of the slow action of the recorder. In my system with a plurality of recorders the time necessary is greatly decreased because the parts of the signal are distributed substantially equally and alternately to the two recorders so that each acts only during one half of the total time and has ample time in which to return to rest without interfering with the speed of transmission. Obviously both the telephone receivers and galvanometers or other recorders may be used at the same time if desired.

It is obvious that while preferred embodiments and modifications thereof by way of example have been described, combinations as between the several figures are possible, the static killer in Fig. 5 for instance being capable of use in Fig. 15. It is to be noted too that in the extreme case the static killer will act as a lightning arrester and protect the receiving apparatus.

Where in my invention parts not before known to the art are utilized I have endeavored in the description to state what is believed to be a probable mode of operation but as the invention resides in the combinations concerned and not in the explanations thereof the statements concerning the theory thereof are tentative and not necessarily precise. Various changes in the size, construction, and variations may obviously be made within the scope of the appended claims. While some of the alternate modified embodiments have been described by way of example the invention is more particularly set forth in the accompanying claims.

It is of course well known that the several parts used in any wireless system, such as transformers, inductances, condensers, etc., are in themselves old and well known but the invention nevertheless resides in the particular combinations thereof whereby the new and useful objects set forth are accomplished.

Having now described my invention and the several details thereof, I claim, and these Letters Patent are to be understood as granted for:

1. In a wireless system, a transmitter, a receiver coöperating therewith, said receiver comprising a tuner adapted to be continuously rotated, and a wave detector associated with said tuner and adapted to be included in a plurality of circuits, whereby energy radiated by said transmitter may be selected and translated by said receiver while energies arising from undesired sources may be dissipated in said circuits.

2. In a wireless system, suitable receiving inductances and means including a rotatable inductive member for selecting desired impulses therefrom.

3. In a wireless system, a rotating inductance and a plurality of circuits in relation therewith, said circuits including means for selecting desired energies therefrom and for dissipating other energies.

4. In a wireless system, a transmitter comprising a wave generator consisting of a plurality of electrodes in close proximity to each other and having a relative motion in the presence of a cooling insulator, means for varying the audible frequency of said generator, means associated with said generator whereby energy may be radiated, in different and distinguishable wavelengths, to represent signal elements, a receiver comprising a wave detector, tuning means associated with said detector to select and supply it with energy from said transmitter, means associated therewith to cause said received energy to indicate said transmitted signal elements, means associated with said receiver to guard said detector from and dissipate other energies reaching said receiver in other greater and lesser wavelengths, and auxiliary means to short circuit said receiver at suitable times when necessary to by-pass energies arising from strong atmospheric disturbances in the vicinity of said receiver without preventing the reception of said transmitted energy.

5. In a wireless system; a transmitter comprising means for radiating energy and means to modify the wavelength and audible frequency thereof; a receiver having means to select and render intelligible energy received from said transmitter, said means comprising a continuously rotatable tuning member.

6. In a wireless system, a receiver comprising a ground terminal, a conductor having capacity with respect thereto, an inductance connecting said ground terminal and conductor, a condenser connected in shunt with a portion but not all of said inductance whereby two circuits are formed, the one through said inductance alone and the other through a portion of said inductance in series with the reactance formed by the remainder of said inductance and the capacity shunted thereabout, a second inductance coupled to the aforesaid inductance and connected with a condenser to form a secondary circuit resonant with one of the aforesaid circuits but not the other, a detector, and an indicator associated with said secondary circuit.

7. In a wireless system, a transmitter, a receiver, said receiver including a rotary tuning member comprising inductances having a continuous relative motion with respect to each other whereby said receiver may select radiant energy emitted by said transmitter and dissipate other energy reaching it.

8. In a wireless system; a transmitter comprising an oscillation producer including an inductance, a second inductance coupled thereto and connected between a ground terminal and a conductor having capacity with respect to the ground, thereby forming a secondary circuit through which radiant energy flows and from which it is radiated, a switch to conductively connect said second inductance to said oscillation producer whereby distinguishable signal elements may be transmitted; a receiver comprising a wave detector and means associated therewith for making said signal elements manifest, and a rotating member associated with said receiver to exclude undesired impulses therefrom.

9. A wireless signaling system including means for dividing the signals into recognized portions, a plurality of interchangeable circuits having a common rotating electrode, means associated with said electrode whereby a different radio and audible frequency energy is caused to flow in each of said circuits, means for severally transmitting the said portions through the interchangeable circuits, a receiving station having circuits corresponding to said interchangeable circuits, means associated therewith to render said transmitted signals manifest, and auxiliary means at the receiving station to dissipate energies coming thereto from other stations and arising from atmospheric disturbances.

10. In a wireless system, a receiver comprising suitable tuning means and a wave detector, means for conveying intelligence to a human operator associated with said detector, and an auxiliary inductance not comprised in said tuning means but shunted about a portion of said wave detector whereby the characteristics of said detector may be altered without adjusting, changing, or moving the electrode terminals by which said detector is connected with said tuning means.

11. In a wireless signaling system, a receiver comprising suitable tuning means, a wave detector, and an indicator, said detector consisting of a sensitive crystal, a large number of electrode surfaces contacting therewith, and means independent of the movement of said surfaces and crystal to adjust the relative effective resistances therebetween.

12. In a wireless system, a receiver including a wave detector comprised by a single crystal in contact with a plurality of conducting electrodes, and an inductance coil independent of said receiver connected to said crystal to increase the sensibility of said contact between said crystal and electrodes.

13. In a wireless system, a receiver including a wave detector comprised by a crystal having a number of metal points in contact therewith and an inductance coil independent of said receiver and connecting at least two of the metal points.

14. In a wireless communication system, a receiver comprising tuning elements and a wave detector, said detector comprising a sensitive crystal contacting with a number of separate pieces of metal and an inductance coil independent of said tuning means connected between any two of said pieces of metal.

15. In a wireless communication system, a receiver comprising a plurality of inductance coils having, as regards each other, a negligibly small percentage of coupling, a closed circuit inductance coil having a relatively large percentage of coupling with respect to at least one of said inductance coils, a wave detector connected to said closed inductance, means associated therewith to suitably indicate energy reaching said wave detector, said plurality of inductances being connected between an elevated conductor and the ground respectively to form a plurality of circuits therebetween and said closed inductance being used to select energy from at least one of said circuits.

16. In a wireless communication system, a receiver comprising two inductance coils connected in parallel and between the antenna and ground respectively of said receiver and having a small percentage of coupling with respect to each other, an inductance coil associated therewith and adapted to be continuously rotated, and means associated therewith to translate received energy.

17. In a wireless communication system, a receiver comprising an antenna, a ground, a tuning member connected therebetween, a coöperating tuning member associated therewith and adapted to be continuously rotated with respect thereto, and means associated therewith to detect and translate desired energy reaching said receiver.

18. In a wireless communication system, a transmitter comprising a current source, circuits and a discharge member connected therewith, said discharge member comprising a revolving disk carrying two sets of discharge surfaces, the one having a greater number thereof than the other, two electrodes in close proximity to said disk in the presence of a gaseous medium under pressure, two oscillatory circuits respectively including said electrodes and embracing respectively the said two sets of discharge surfaces on said disk, a radiating circuit associated with said oscillatory circuits, means to transmit energy representing a dot of a code via one of said oscillatory circuits and for transmitting energy representing a dash of a code via the other oscillatory circuit, and a receiver comprising means for selecting and translating said energies reaching it from said transmitter.

19. In a wireless communication system, a transmitter comprising a current source and circuits connecting it with a pair of discharge gaps each of which includes an oscillatory circuit having a different period than that of the other, means for simultaneously rotating at least one electrode of each of said gaps in the presence of hydrogen-containing gas, means for obtaining a different audible group frequency from each of said gaps and their associated circuits, and a radiating circuit coupled to each of said oscillatory circuits, and a receiver comprising means for absorbing, selecting, and translating energy radiated to it from said transmitter in either of the group frequencies and periods.

20. In a wireless communication system, a transmitter comprising a source of electrical energy, circuits respectively connecting a rotating electrode and two coöperating electrodes therewith, a gaseous medium under pressure between said electrodes, a pair of circuits each containing different values of inductance and capacity connected around said electrodes, a secondary and radiating circuit inductively coupled thereto, and a receiver comprising circuits to select energies reaching it from said transmitter and translate them into sound waves.

21. In a wireless communication system, a transmitter comprising a source of electrical energy, circuits respectively connecting a pair of discharge gaps therewith, said discharge gaps comprising respective sets of uniformly spaced electrodes carried by a rotating disk in close proximity to coöperating electrodes in the presence of a cooling dielectric whereby different musical tone effects are secured when using the respective gaps with their different sets of electrodes, a circuit containing inductance and capacity connected with said gaps and with a radiating circuit, and a receiver comprising means to select and translate energy reaching it from said transmitter when transmitted via either of said gaps.

22. In a wireless communication system, a receiver comprising means to select, detect, and translate desired radiated energy reaching it, and auxiliary means for alternately short circuiting and again operatively connecting said selecting means at a rate rapid enough not to prevent the reception of the desired energy, to by-pass said selecting means, for protection from energies reaching the receiver and arising from strong atmospheric disturbances.

23. In a wireless communication system, a receiving set, an antenna and a ground terminal connected thereto, and a device shunted about said receiving set comprising means to connect said antenna and ground through a direct auxiliary circuit and disconnect same alternately at a rate which does not prevent the reception of desired signals.

24. In a wireless system, a receiving set, an antenna and a ground terminal respectively connected thereto and means for dissipating static charges as they accumulate intermittently connected in series with said aerial and ground at a rate which does not prevent the reception of desired signals.

25. In a wireless communication system a transmitter comprising means to radiate a plurality of differentiated groups of wave trains representing respective elements of a signal and including a segmental rotary gap discharger adapted to impart distinguishable musical tones to each of said groups, and a receiver comprising means to select each of said groups of wave trains which reach it and translate them into intelligible sound waves and auxiliary means to neutralize and dissipate undesired energies reaching said receiver from other transmitters and from atmospheric disturbances.

Signed at Minneapolis, Minn., this 14th day of August, 1912.

PHILIP E. EDELMAN.

Witnesses:
ANNETTE MARTINSON,
MEYER I. EDELMAN.